(12) United States Patent  
Cuppett

(10) Patent No.: US 8,378,241 B1  
(45) Date of Patent: Feb. 19, 2013

(54) SELF-LOCKING CONNECTOR CLIP

(75) Inventor: Matthew D. Cuppett, Uniontown, PA (US)

(73) Assignee: ABB Technology AG, Zurich (CH)

( * ) Notice: Subject to any disclaimer, the term of this patent is extended or adjusted under 35 U.S.C. 154(b) by 10 days.

(21) Appl. No.: 13/192,785

(22) Filed: Jul. 28, 2011

(51) Int. Cl.
*H01H 31/02* (2006.01)
(52) U.S. Cl. .................................................... 200/48 R
(58) Field of Classification Search ............... 200/17 R, 200/540, 291, 237, 238, 282, 284, 250, 401; 439/839, 833, 867
See application file for complete search history.

(56) References Cited

U.S. PATENT DOCUMENTS

| | | | |
|---|---|---|---|
| 4,351,583 A * | 9/1982 | Belttary | 439/839 |
| 4,442,329 A | 4/1984 | Gray et al. | |
| 4,733,033 A * | 3/1988 | Morris et al. | 200/401 |
| 5,319,166 A * | 6/1994 | Arnold et al. | 200/17 R |
| 5,478,980 A | 12/1995 | Freeman et al. | |
| 6,323,448 B1 * | 11/2001 | Seymour et al. | 200/237 |
| 6,630,638 B1 | 10/2003 | Freeman et al. | |
| 7,852,617 B2 * | 12/2010 | Lee | 361/676 |

* cited by examiner

*Primary Examiner* — Edwin A. Leon
(74) *Attorney, Agent, or Firm* — Melissa J. Szczepanik

(57) ABSTRACT

A clip for connecting a conductor to a circuit interrupter in an electrical device is generally U-shaped and self-locking. The clip has a generally arcuate body and two generally linear legs. The legs extend vertically from the body. The legs have beveled edges that together with the generally arcuate body of the clip and a flat portion of the clip, allow an interlock to be formed between the clip and the conductor when the clip is in close contact with the conductor.

15 Claims, 4 Drawing Sheets

SELF-LOCKING CONNECTOR CLIP

FIELD OF INVENTION

The present application is directed to a self-locking connector for connecting a circuit interrupter to a conductor in an electrical device such as a dead tank circuit breaker.

BACKGROUND

Electrical devices such as dead tank circuit breakers are typically comprised of one or more elongated tanks containing one or more circuit interrupters to interrupt fault currents and prevent the occurrence of an arc fault. A dead tank circuit breaker has a plurality of bushings that extend from an outer surface of the tank. A conductor extends through the length of each bushing and is often connected to the circuit interrupter directly. The connection between the circuit interrupter and the conductor is typically made by bolting or pinning the circuit interrupter to the conductor coaxially or by the use of insulating support tubes to support the circuit interrupter on both ends. Known methods of attaching the circuit interrupter to the conductor are costly and present difficulty in accessibility and alignment of the conductors within the bushings.

SUMMARY

A clip for securing a circuit interrupter to a conductor in an electrical device is comprised of a body having a generally arcuate shape and legs having a first beveled portion, a second flat portion and a third beveled portion, respectively. The legs extend vertically from opposing sides of the body from a connection point where the first beveled portions of the legs connect to the body.

The clip is adapted for removable insertion into a slot inside a housing structure of the circuit interrupter. The body of the clip and the first beveled portion of each of the legs of the clip engage with a groove on a first end of the conductor when the clip is inserted into the slot. The clip is disengaged from the groove on the first end of the conductor when the clip is removed from the slot.

A method of connecting a conductor to a circuit interrupter within an electrical device comprises inserting a first end of the conductor into an opening in an interrupter housing structure. The first end of the conductor is adapted to engage with the opening of the interrupter housing structure. Then, the conductor is positioned within the interrupter housing structure so that a groove in the conductor is horizontally aligned with a slot in the interrupter housing structure. Lastly, a self-locking clip is inserted into the slot of the interrupter housing so that a generally arcuate portion of the clip removeably engages with an arcuate portion of the conductor to form an interlock. The clip is disposed entirely within the interrupter housing structure when removeably engaged with the conductor.

BRIEF DESCRIPTION OF THE DRAWINGS

In the accompanying drawings, structural embodiments are illustrated that, together with the detailed description provided below, describe exemplary embodiments of a self-locking connector clip. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
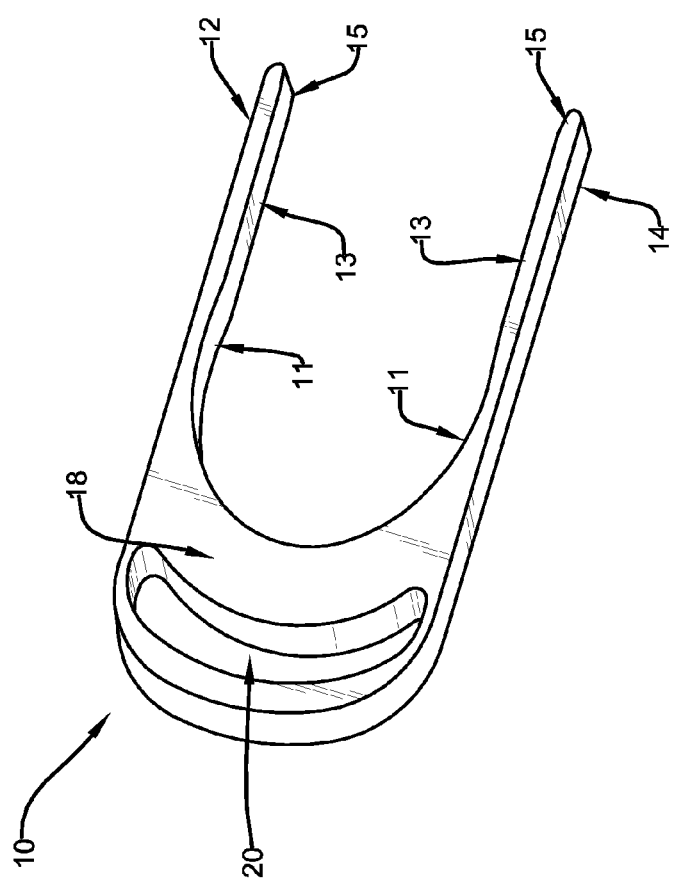
FIG. 1 is an isometric view of a self-locking connector clip embodied in accordance with the present invention.

Referring to FIG. 1, a self-locking connector clip 10 embodied in accordance with the present invention is shown. The self-locking connector clip 10 (hereinafter "clip") is of a generally U-shape and formed from a corrosion-resistant metal. In one embodiment, the corrosion-resistant metal is stainless steel having a tensile strength of about 600 MPa and a thickness of about 6 mm. The clip 10 has a body 18 that is generally arcuate, and two legs 12, 14 that are generally linear. The legs 12, 14 extend from opposing side portions of the body 18. The body and legs 18, 12, 14 of the clip 10 are generally rigid, however, the rigidity may vary depending on the application.

In that same embodiment, the clip 10 is about 110 mm in overall length and about 70 mm in overall width. The body of the clip 18 is about 60 mm long and about 70 mm wide and has a generally arcuate-shaped opening 20 that is about 10 mm in length and about 65 mm in width formed therein. The legs 12, 14 are each about 50 mm in length, measured from their respective connection points with the body 18. The legs 12, 14 are symmetrical and extend vertically from opposing sides of the body 18. The legs 12, 14 have a first beveled portion 11, a second flat portion 13, and a third beveled portion 15, respectively. The first beveled portion 11 serves as the extension point of the legs 12, 14 from the body of the clip 10. The second flat portion 13 of the legs 12, 14 extends from the corresponding first beveled portion 11. The third beveled portion 15 extends from the second flat portion 13, respectively.

The first beveled portion 11 of the legs 12, 14 is beveled gradually at about 1.5 mm over a length of about 6 mm. The second flat portion 13 of the legs is linear and about 36 mm in length. The third beveled portion 15 of the legs 12, 14 is beveled gradually, at about 1.5 mm over a length of 6 mm. The first beveled portion 11, second flat portion 13, and third beveled portion 15 of the legs 12, 14 allow the clip 10 to engage with a grooved portion 25 on a first end of a conductor 24.

The connection between the conductor 24 and a housing structure 40 of a circuit interrupter 60 may be made by inserting the first end of the conductor 24 into an opening 42 in the interrupter housing structure 40. The groove 25 of the conductor first end 24 may then be aligned horizontally with a slot 28 formed within the interrupter housing structure 40.

The clip 10 may then be inserted into the slot 28. The clip 10 holds the conductor 24 in place within the circuit interrupter housing structure 40 by engaging with the grooved portion 25 of the conductor 24 first end. The grooved portion 25 extends around the circumference of the conductor 24 first end. In one embodiment, the clip 10 is adapted for mating with a generally arcuate conductor 24 that is about 76 mm in diameter.

The conductor 24 may be formed of copper, aluminum or another metal. The interrupter housing 40 is generally formed of aluminum or another metal.

The clip 10 has a self-locking feature due to the difference in thickness between the first and third beveled portions 11, 15 and the second flat portion 13 of the legs 12, 14. The legs 12, 14 range in thickness from about 8 mm to about 9.5 mm over their respective lengths. The difference in thickness between the beveled portions of the legs 11, 15 and the second flat portion 13 of the legs 12, 14 is about 1.5 mm and locks the clip 10 securely in place when engaged with the generally arcuate conductor 24.

In one embodiment, the third beveled portion 15 is used initially to ease and slide the clip onto an outer surface of the conductor 24. The third beveled portion 15 may ease the transition of the outer surface of the conductor 24 to the second flat portion 13 of the clip 10. The conductor 24 may then come to rest against the generally arcuate portion of the body 18 of the clip 10 after traveling over the first beveled portion 11. In that same embodiment, the difference in dimensions between the second flat portion 13 and the first beveled portion 11 create an interlock between the clip 10 and the outer surface of the conductor 24.

Figure 2:
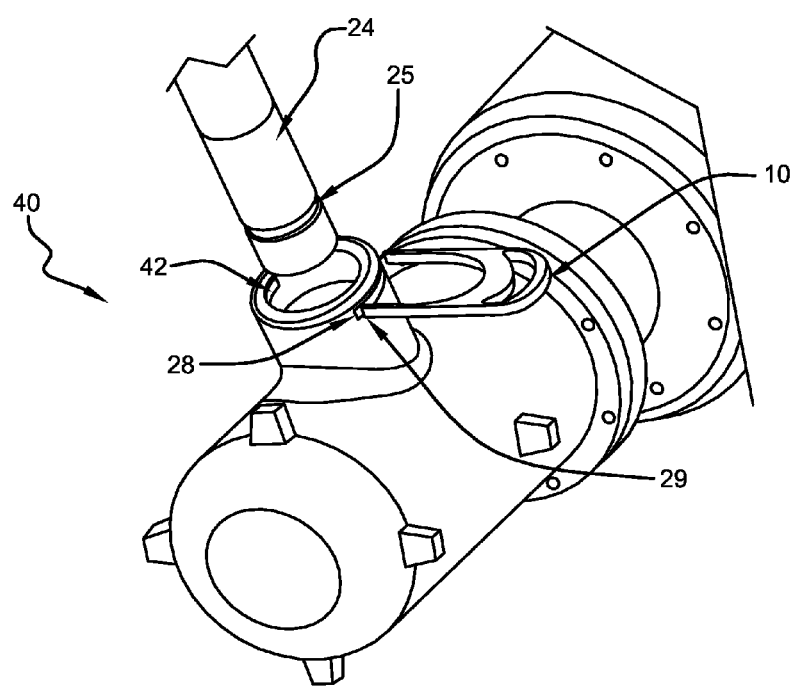
FIG. 2 is side view of the self-locking connector clip, showing a slot in a circuit interrupter for inserting the self-locking connector clip therein.
Figure 3:
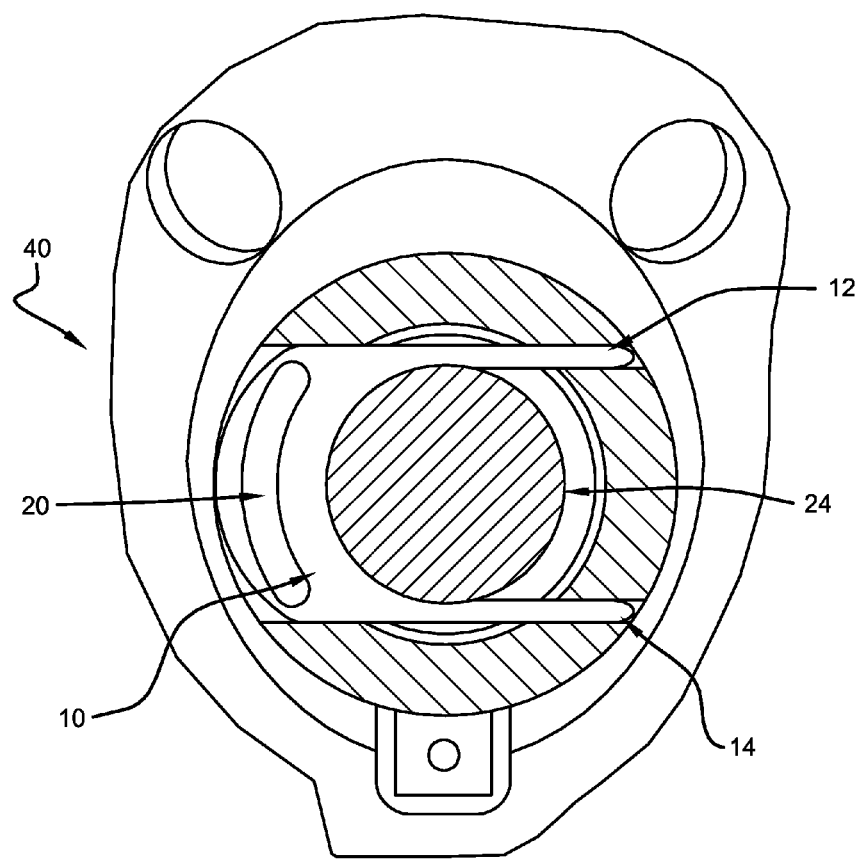
FIG. 3 is a top view of the self-locking connector clip and the circuit interrupter housing, showing the self-locking connector clip in engagement with a conductor and the interrupter slot.

Referring now to FIGS. 2 and 3, the clip 10 is designed to fit within a machined slot 28 formed in a housing structure of a circuit interrupter 40. In one embodiment, the clip 10 may be inserted into a slot 28 that is about 75 mm in length and about 7 mm in width. The slot 28 is formed within an interrupter housing 40 of a dead tank circuit breaker 50, gas-insulted switchgear or similar electrical device. One having ordinary skill in the art will recognize that other embodiments of the self-locking clip 10 may be used in electrical devices including but not limited to dead tank circuit breakers 50 and gas-insulated switchgear. Other embodiments may employ a clip 10, a conductor 24, a conductor groove 25 and a slot 28 with varying dimensions. When the clip 10 is used with gas-insulated switchgear (not shown), the conductors 24 are generally telescoping in nature. The clip 10, in such an embodiment, may be utilized when the conductor(s) 24 of the gas-insulated switchgear is (are) in a fully extended position.

When the clip 10 is fully engaged with the conductor 24 inside the circuit interrupter housing 40, the legs 12, 14 extend laterally through the interrupter housing 40 and the clip 10 is fully contained within an inner surface of the interrupter housing 40.

The generally arcuate opening 20 in the body of the clip 18 is used for gripping the clip 10 during its insertion and removal. Tools are not required for installation of the clip 10 as the clip 10 can be accessed through an extended slot 29 in the interrupter housing 40. The extended slot 29 connected to the interrupter housing slot 28 is large enough to accommodate reaching inside the interrupter housing 40 and grasping the opening 20 of the clip 10. The clip 10 may then be disengaged from the conductor 24 and the interrupter housing 40.

Figure 4A:
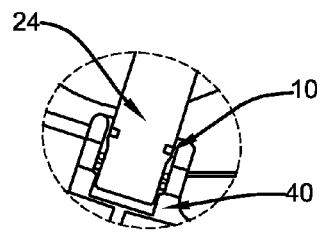
FIG. 4a is an inset that depicts the connection between the conductor and the circuit interrupter housing the self-locking connector clip embodied in accordance with the present invention.
Figure 4:
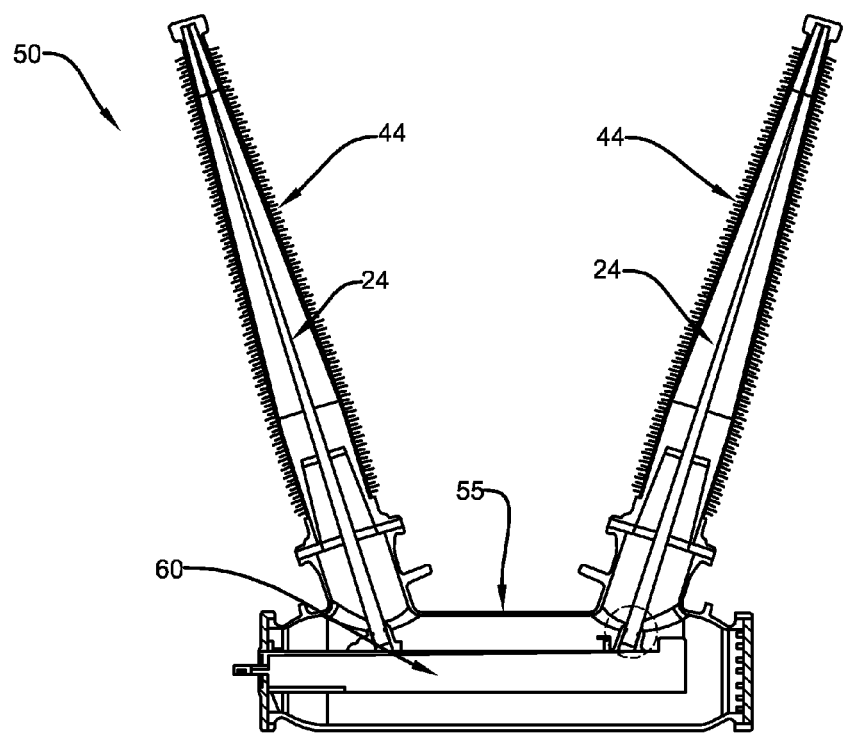
FIG. 4 is a front elevational view of an exemplary dead tank circuit breaker. An inset shows the location of the self-locking connector clip within the housing of an interrupter within the dead tank circuit breaker.

Referring now to FIGS. 4 and 4a, more than one clip 10 may be utilized per electrical device. For instance, in an exemplary dead tank circuit breaker 50 there may be one or more tanks 55 containing one or more circuit interrupters and each tank 55 may have one or more bushings 44 attached thereon. Each conductor 24 extends through the length of the associated bushing 44. Each conductor 24 may require a clip 10 for attachment to an associated one of a plurality of interrupter housing structures 40.

The clip 10 provides ease of alignment when attaching a conductor 24 to the housing structure of an interrupter 40. The conductor 24 will extend through the length of the bushing 44 at the desired angle when connected to the interrupter housing 40 using the clip 10. The conductor 24 may extend diagonally or vertically in relation to the horizontal plane of the interrupter housing 40. Further, the conductor 24 extends diagonally, vertically, or at another angle through the length of the bushing 44.

As the clip 10 may be used in lieu of bolted connections between the interrupter housing 40 and the conductor 24, less friction will occur between the parts when the dead tank circuit breaker 50 or similar device vibrates. For this reason, the surface of the clip 10 may be less likely to erode than prior bolted connections.

While the present application illustrates various embodiments of a self-locking connector clip 10, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A clip for securing a circuit interrupter to a conductor in an electrical device, said clip comprising:
a body having a generally arcuate shape; and
legs having a first beveled portion, a second flat portion and a third beveled portion, respectively, said legs extending vertically from opposing sides of said body from a connection point wherein said first beveled portion of said legs connect to said body,
said clip being adapted for removable insertion into a slot in a housing structure of said circuit interrupter,
said second flat portion and said first beveled portion of each of said legs of said clip engaging with a groove on a first end of said conductor when said clip is inserted into said slot, and said clip disengaging from said groove when said clip is removed from said slot.

2. The clip of claim 1 wherein when said clip is removeably engaged with said conductor, said conductor is operable to extend along a diagonal axis in relation to the plane of the interrupter housing structure, said conductor extending diagonally through a bushing attached to said electrical device.

3. The clip of claim 1 wherein when said clip is removeably engaged with said conductor, said conductor is operable to extend along a vertical axis in relation to the plane of the interrupter housing structure, said conductor extending vertically through a bushing attached to said electrical device.

4. The clip of claim 1 wherein said clip is disposed entirely within an inner surface of said interrupter housing structure when said clip is removeably engaged with said conductor.

5. The clip of claim 1 wherein said clip legs are generally linear.

6. The clip of claim 1 wherein when said clip is removeably engaged with said conductor, said first beveled portion and said second flat portion of said legs form an interlock with an arcuate portion of said conductor.

7. The clip of claim 1 wherein said second flat portion of said legs is longer than said beveled first end portion and said beveled third end portion.

8. The clip of claim 1 wherein said clip is comprised of a metal.

9. The clip of claim 8 wherein said metal is comprised of stainless steel.

10. The clip of claim 1 wherein said third beveled portion is used to slide the clip onto an outer surface of said conductor.

11. The clip of claim 1 wherein a generally arcuate opening is disposed within said first end of said clip for gripping said clip during removal from said housing structure of said circuit interrupter.

12. The clip of claim 1 wherein said legs extend laterally through said interrupter housing structure when removeably engaged with said conductor.

13. A method of connecting a conductor to a circuit interrupter within an electrical device, comprising:

a. inserting a first end of a conductor into an opening in said interrupter housing structure, said conductor first end adapted to engage with said opening of said interrupter housing structure;
 b. positioning said conductor within said interrupter housing structure so that a groove in said conductor first end is horizontally aligned with a slot in said interrupter housing structure; and
 c. inserting a self-locking clip into said interrupter housing structure slot so that a generally arcuate portion of said clip removeably engages with an arcuate portion of said conductor first end to form an interlock, said clip disposed entirely within said interrupter housing structure when removeably engaged with said conductor.

14. The method of claim 13 wherein said slot in said interrupter housing structure is created prior to inserting said conductor first end into said housing opening.

15. The method of claim 13 wherein said self-locking clip has legs that are operable to engage with said arcuate portion of said conductor first end.

* * * * *